Figure 1:
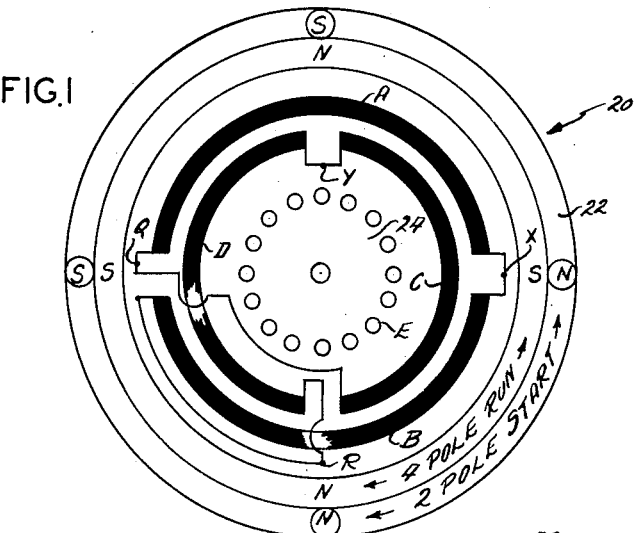

April 24, 1962 C. R. CANTONWINE 3,031,606
ELECTRIC MOTOR CONSTRUCTION
Filed May 27, 1957 3 Sheets-Sheet 1

INVENTOR
CHARLES R. CANTONWINE
By Gravely, Lieder, Woodruff and Wills
ATTORNEYS.

April 24, 1962  C. R. CANTONWINE  3,031,606
ELECTRIC MOTOR CONSTRUCTION

Filed May 27, 1957  3 Sheets-Sheet 2

INVENTOR:
CHARLES R. CANTONWINE

By Gravely, Lieder, Woodruff and Wills
ATTORNEYS.

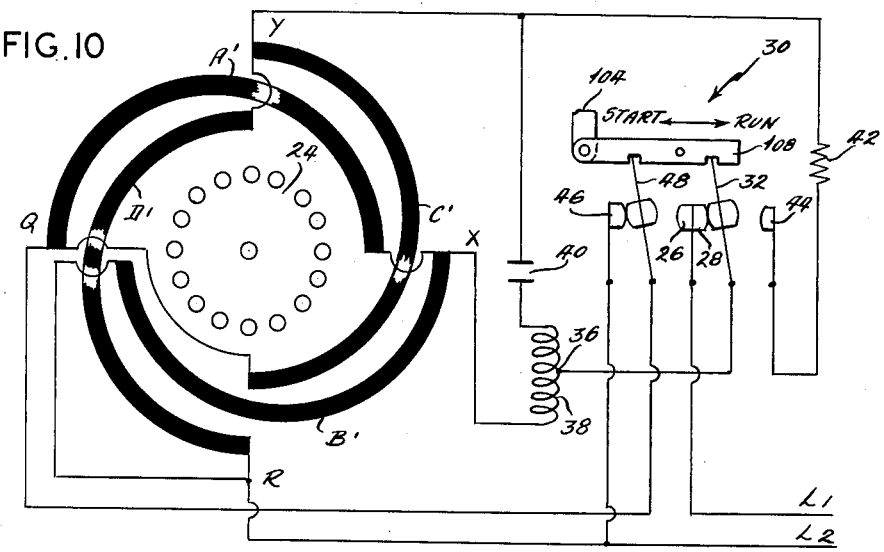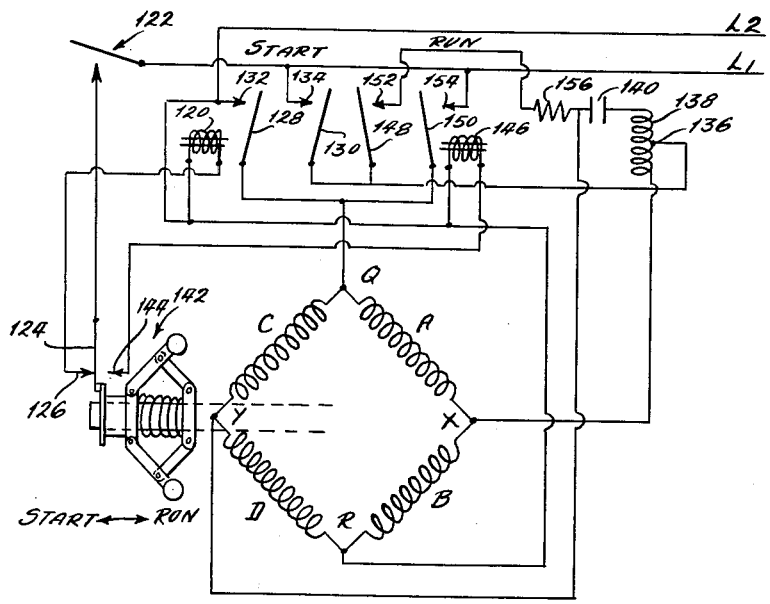

United States Patent Office 3,031,606
Patented Apr. 24, 1962

3,031,606
ELECTRIC MOTOR CONSTRUCTION
Charles R. Cantonwine, Rte. 1, Box 651,
Hot Springs, Ark.
Filed May 27, 1957, Ser. No. 661,634
5 Claims. (Cl. 318—221)

This invention relates to motors in general and more particularly to improved means for starting and running alternating current motors which enable such motors to have increased starting and running torque and to operate more efficiently.

In the past, it has been the practice to provide alternating current motors with separate starting and running windings. Once these motors reached a predetermined speed, the starting winding was disconnected from the circuit or otherwise made ineffective and became deadweight at running speeds.

The present invention overcomes this objectionable feature of known motor constructions by providing a relatively simple motor construction which uses all of the windings in the motor for running and starting, thereby increasing the torque and efficiency of the motor.

It is therefore a principal object of this invention to provide a single speed alternating current motor that employs all of its windings for starting and running.

Another object of the invention is to increase the efficiency, power and torque of alternating current motors.

Another object of the invention is to provide an alternating current motor with improved starting and running characteristics which is relatively simple and inexpensive to construct.

Another object of the invention is to provide an alternating current motor with improved pull-up, pull-in and pull-out characteristics when changing between starting to running conditions and which reduces to a minimum the noise and vibration associated with these changes.

Another object of the invention is to substantially increase the torque and efficiency of alternating current motors by means that can be installed as original equipment or added as an improvement on existing motors.

Another object is to eliminate the need for a separate starting winding on alternating current motors.

Another object is to increase the output for a given size motor frame.

Another object is to enable one motor frame to be used for single phase and polyphase operation at the same ratings.

Another object is to permit the use of cheaper, more available materials in motors.

Another object of the invention is to permit the use of lighter weight materials in a given motor frame without down rating the frame size.

Another object of the invention is to provide an alternating current motor that has relatively higher starting than running impedance.

Another object is to provide an alternating current motor which can switch from start to run condition at speeds greater than, equal to, or less than the running speed.

Another object is to provide an alternating current motor that is adaptable to being constructed with almost any desired starting and running characteristics.

Still another object of the invention is to provide means by which synchronous motors can drop into rather than pull into synchronous speed.

These and other objects and advantages of the present invention will become apparent after considering the following detailed specification in conjunction with the accompanying drawings.

Figure 2:
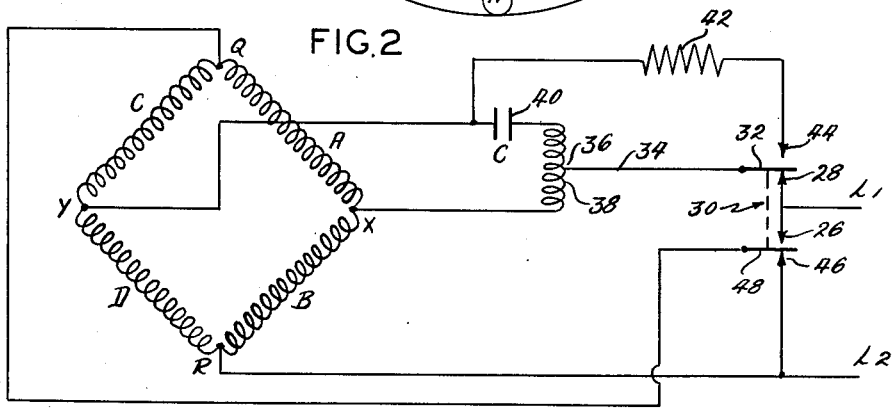
Figure 4:
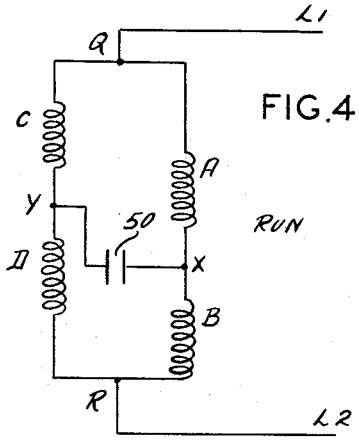
Figure 3:
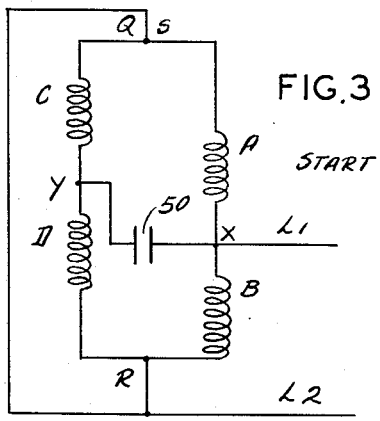
Figure 5:
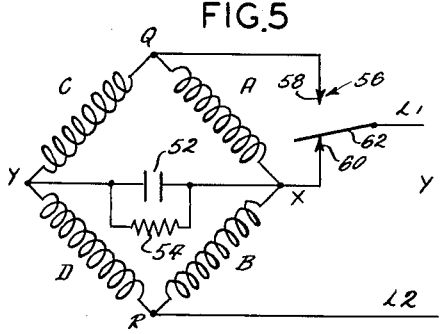
Figure 6:
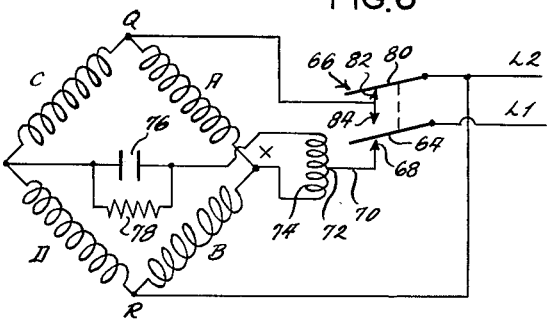
Figure 7:
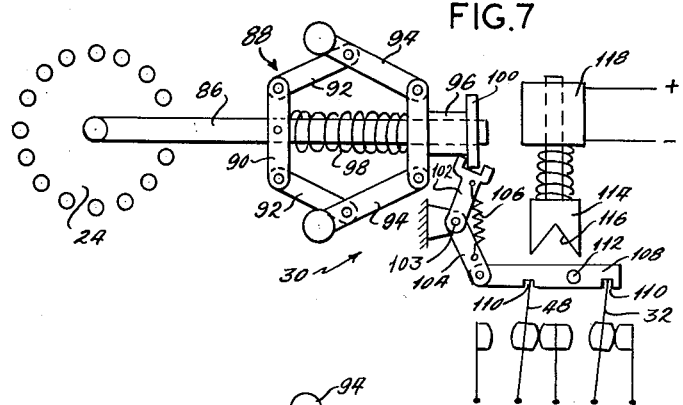
Figure 8:
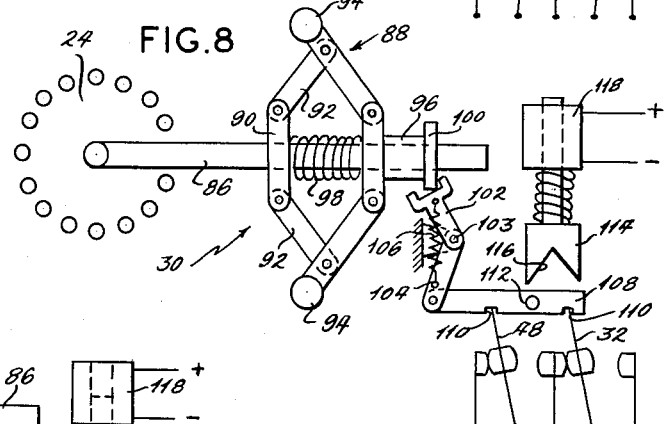
Figure 9:
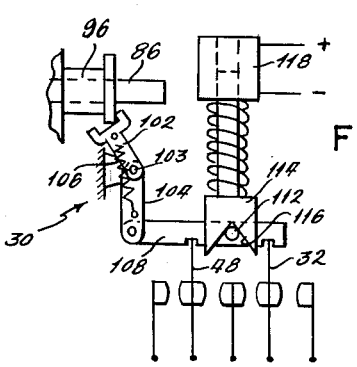

In the drawings:

FIG. 1 is a schematic drawing showing a motor embodying the present invention,

FIG. 2 is a schematic wiring diagram of the electrical circuit for the motor shown in FIG. 1, FIG. 3 is a schematic wiring diagram showing a modified form of the circuit for the motor in FIG. 1, the circuit being shown in the starting condition, FIG. 4 is a schematic wiring diagram similar to FIG. 3 showing the circuit in the running condition, FIG. 5 is a modified schematic wiring diagram for the motor of FIG. 1, the diagram being shown in the starting condition, FIG. 6 is another modified schematic wiring diagram for the motor of FIG. 1 in the starting condition, FIG. 7 shows the switch mechanism for the present invention in starting condition, FIG. 8 is a view similar to FIG. 7 showing the switch mechanism in the running condition, FIG. 9 is another view of the same switching mechanism shown in the "off" condition, FIG. 10 is a schematic circuit diagram similar to FIG. 2 but showing a modified construction for the motor and motor circuit, and FIG. 11 is a schematic view showing another modified form of the motor and motor circuit.

Referring to the drawings by reference numbers, the number 20 in FIG. 1 refers to a motor which has a stator 22 and a rotor 24. The stator 22 has four windings designated A, B, C and D and the rotor 24 has a winding designated E.

The stator windings A and B are opposite each other on the stator 22 (FIG. 1) and are physically located further out from the rotor 24 than windings C and D. Windings C and D are also opposite each other and are offset 90 degrees from the windings A and B. Each of the windings A, B, C and D are herein defined as a pole group.

Winding A is connected to winding B at X, winding B is connected to winding D at R, winding D is connected to winding C at Y, and winding C is connected to winding A at Q. Therefore, the windings A, B, C, and D are electrically connected together to form a closed loop as shown in FIGS. 1–6, 10 and 11.

FIG. 2 shows a schematic wiring diagram of the motor 20 connected to a source of energy. The diagram is shown in starting condition with power leads L1 and L2 supplying energy to the motor 20. The lead L1 is connected to normally-open and normally-closed switch contacts 26 and 28 respectively which are located on a speed responsive switching device 30. The normally-closed contact 28 is engaged during starting operations with a switch blade 32 which is connected by lead 34 to an intermediate tap 36 on a reactor coil 38. One side of the reactor coil 38 is connected to the stator windings A and B at X, and the opposite side of the reactor coil 38 is connected to a capacitor 40, the opposite side of which is connected to the stator windings C and D at Y and to a resistor 42. The opposite side of the resistor 42 is connected to a normally-open contact 44 which engages the switch blade 32 when in the transferred position thereof.

The lead L2 is connected to the stator windings B and D at R and to a normally-closed contact 46 on the switching device 30. A switch blade 48, which is ganged to operate with the switch blade 32, engages the contact 46 during starting and connects the lead L2 to the stator windings A and C at Q. The switch blade 48 engages with the normally-open contact 26 in its switched position.

In the starting condition of the motor, as described, the input voltage across leads L1 and L2 is impressed across four parallel circuits, each of which contains one of the stator windings. Two are from lead L1 to contact 28, contact 32, lead 34, through the lower portion of the coil 38 to X, and through the parallel combination of the stator windings A and B to lead L2; and the other two are from lead L1 to contact 28, contact 32, through the upper portion of the reactor coil 38, through capacitor 40 to Y, and through the parallel combination of the stator windings C and D to the lead L2.

As shown in FIGS. 2, 6, 10 and 11 of the drawings, the reactor element is provided with an intermediate tap. During starting of the motor, part of the reactor is connected in the starting winding circuit and another part is connected in circuit with the main winding. By using a single reactor element, as shown, there will be mutual inductance between the several portions of the reactor, and this will produce an autotransformer action. This means, for example, that the current through the lower half of the reactor, such as the reactor 38 in FIG. 2, which is in series with the main winding across the line during starting will induce a voltage in the upper half of the reactor which is connected in the starting winding circuit. This in turn means that the voltage across the starting winding circuit will be higher during starting than otherwise would be the case.

The capacitor 40 produces a phase shift between the windings C and D and the windings A and B, and this provides starting torque for the motor 20.

The speed of the motor 20 increases during starting until a predetermined speed, approximately equal to the running speed, is reached at which time centrifugal switching mechanism which will be described hereinafter responds and transfers the switch blades 32 and 48 to positions engaging their associated normally-open contacts 44 and 26 respectively. When this happens, the line voltage is impressed across two parallel motor circuits, each containing two stator windings in series as follows: from lead L1 to contact 26, contact 48, to stator windings A and C at Q, through a parallel circuit consisting of windings A and B (in series) and windings C and D (in series) to R, and to lead L2. This is the running circuit for the motor 20, and in the running condition the voltage at connections X and Y is substantially the same (assuming that all of the stator windings have approximately the same impedance). This being the case, there is zero voltage and zero current flow between points X and Y. Since the reactor coil 38 and the shunted capacitor 40 are in series across the points X and Y, they are rendered ineffective during the running connection. There are therefore no active impedances in circuit during the single speed running connection.

When the switching device 30 transferred to the running condition, the switch blade 32 moved into engagement with contact 44 and closed a circuit for limiting the discharge current of the capacitor 40 and reducing the impedance across winding connections X and Y. The discharge circuit is through the upper portion of the reactor coil 38, through capacitor 40, resistor 42 and through the engaged contacts 44 and 32. This circuit, is a refinement on the more basic circuit shown in FIGS. 3 and 4, and is included to provide means for preventing a charge from accumulating on the starting capacitor 40 during running of the motor 20.

It is important to note that during starting, the stator windings are connected having two poles positioned as shown in FIG. 1; and during running, with the switch mechanism operated, the stator windings are connected having four poles. The motor 20 is essentially a single speed motor, and although it starts with a two pole connection, this is only incidental to accomplish another purpose, and it is permitted to reach only approximately one-half of the normal two pole running speed, which corresponds to the normal four pole running speed. This is controlled by the speed responsive switch 30. Therefore, by properly selecting the operation speed for the centrifugal mechanism 30, the motor 20 can be made to transfer from the start to the run condition at a speed that is less than, equal to, or greater than the running speed.

Usually, however, it is desirable to adjust the switching device 30 to make the change-over at a speed slightly greater than running speed so that the motor 20 drops into running speed rather than pulls into running speed. This eliminates or greatly reduces the shock and vibration which normally occurs during switch-over and enables the motor 20 to be adjusted to have improved pull-up, pull-in, and pull-out characteristics.

FIGS. 3 and 4 show a modified and simplified form of the motor circuit. FIG. 3 illustrates the starting condition of the circuit, and FIG. 4 the running condition thereof. The difference between the modified circuit of FIGS. 3 and 4 and the circuit of FIG. 2 is that the former has a starting capacitor 50 connected directly between X and Y and does not have a reactor such as reactor 38, or a discharge resistor such as resistor 42. It is anticipated, however, that a switching device similar to the centrifugal switching device 30 of FIG. 2 is included with the circuit of FIGS. 3 and 4 to switch between the starting and the running conditions.

FIG. 5 shows another modified form of the circuit for the motor 20. In this circuit a capacitor 52 shunted by a resistor 54, is connected between the points X and Y, a lead L2 is connected to R, and a switching device 56 having a normally-open contact 58, a normally-closed contact 60, and a switch blade 62 is connected between Q and X. The switch blade 62 is connected to the lead L1, and as the circuit is shown with the switch blade 62 engaging contact 60, the modified construction is in starting condition. In the starting condition, windings B and D, primarily employed, and the phase shift is provided by the parallel combination of the capacitor 52 and the resistor 54 in series with winding D across winding B. The switching device 56 does not necessarily require the contact 58, as winding junction Q may be connected directly to L1 and also to the movable contact 62 to simplify the switching. This will short circuit winding A during the starting connection, but otherwise will have very little effect on the starting torque or starting current as windings A and C are in the magnetic shadow of the low impedance rotor.

In running condition with the switch blade 62 engaging contact 58, if used, the series connected windings C and D are connected in parallel with the series connected windings A and B.

FIG. 6 shows another modified form of the circuit for the motor 20. Lead L1 is connected to switch blade 64 which is located on switching device 66, the contact 64 is engaged with a normally-closed contact 68 and the contact 68 is connected by lead 70 to an intermediate tap 72 on a reactor coil 74. The lower side of the coil 74 is connected to the stator windings A and B at X and the upper portion of the coil 74 is connected to a parallel combination of capacitor 76 and shunting resistor 78, the opposite sides of which are connected to the stator windings C and D at Y.

The lead L2 is connected to a switch blade 80 on the switching device 66 and during starting the switch blade 80 engages normally-closed contact 82 which is connected to the stator windings A and C at Q. The contact 82 is common with a normally-open contact 84 that is engaged by the switch blade 64 in its operated condition. Except for the fact that the resistance 78 is permanently shunted across the capacitor 76, the circuit shown in FIG. 6 is substantially the same and operates substantially the same as the circuit shown in FIG. 2.

FIGS. 7, 8, and 9 show the mechanical details of a centrifugal switching device such as that used to operate the switching devices 30, 56, and 66. The mechanical construction consists of a shaft 86 which is an extension of the motor shaft. A centrifugal actuator 88 is mounted on the shaft 86 and consists of a member 90 which is attached to the shaft 86, members 92 which are hingedly attached at opposite ends of the member 90, and weighted members 94 hingedly attached to the members 92 and to a slide member 96 which is slidably mounted on the shaft 86. A spring 98 is mounted on the shaft 86 between the member 90 and the slide member 96 to urge the slide member 96 away from the member 90. When the shaft 86 is stopped or is rotating at a slow speed, the spring 98 is able to hold the members 90 and 96 apart. However, as the speed of rotation increases, the centrifugal force acting on the weight members 94 moves them outwardly and causes the member 96 to move toward member 90.

A flange 100 on the slide member 96 cooperates with a bifurcated member 102 which is pivoted on a stationary stud 103; and a link 104, also pivoted on the stud 103, is connected to the member 102 by a spring 106. The link 104 is connected at its opposite end to an operator member 108 which has two notches 110 that receive and move the switch blades 32 and 48 back and forth. The spring 106 is included to move the operator 108 and to make sure that it moves far enough in both directions for the switch blades 32 and 48 to make good contact.

The member 108 also has a sidewise extending stud 112 mounted thereon. The stud 112 is positioned on the member 108 beneath an inverted V-shaped notch 116 in a solenoid armature 114. A solenoid coil 118 is positioned around the upper portion of the armature 114 and is energized during starting and running operations to hold the armature 114 in a raised position. When the solenoid 118 is de-energized, however, by a control or pilot switch (not shown), the armature 114 moves downwardly and the notch 116 engages the sidewise extending stud 112 and moves the stud 112 to a position under the vertex of the notch 116. This moves the switch blades 32 and 48 to their "off" positions spaced from both the associated normally-open and normally-closed contacts. In the "off" position, the motor is inoperative and will not run.

FIG. 7 shows the switch actuating device in the start position before the motor reaches the predetermined operating speed therefor. FIG. 8 shows the actuating device 30 in its operative position when the motor is running after the switch blades 32 and 48 are transferred, and FIG. 9 shows the de-energized position of the motor 20 with the armature 114 moved down and the V slot 116 engaging the sidewise extending stud 112.

FIG. 10 shows another modified construction of the stator 22 in which the stator windings A', B', C' and D' overlap and are arranged symmetrically. In this modification, all the windings can be constructed identically, thereby providing a better balanced motor, and this also eliminates the problem of stocking more than one kind of stator winding. The circuit associated with the motor construction shown in FIG. 10 is the same as the circuit shown in FIG. 2, and the corresponding parts are identified by the same numbers. The switching device 30 shown in FIG. 10 is similar to that shown in FIGS. 7, 8 and 9.

FIG. 11 shows another modified form of the circuit for the motor 20. In this modification, the motor controls including the starting capacitor, the reactor, the changeover switch, and the control relays therefor are located at a remote position relative to the motor. The motor controls shown in FIG. 11 include a relay coil 120 which is connected across the power leads L1 and L2 and which is energized by actuating a start switch 122. When the start switch 122 is actuated, a circuit to energize coil 120 is completed from lead L1 through the start switch 122, to a switch blade 124, to a normally-closed contact 126 which is engaged with the contact 124, through the relay coil 120, and to the lead L2.

The energizing of relay coil 120 transfers the switch blades 128 and 130 into engagement with the normally-open contacts 132 and 134 respectively and closes the following starting circuits for the motor: from lead L1 to the contact 134, contact 130, to an intermediate tap 136 on reactor coil 138, through the lower portion of the reactor coil 138 to the stator coils A and B at X, through coil A to Q, to contact 128, contact 132, and to the lead L2; a second circuit similar to that described is closed from X through stator winding B to R, to contact 132, and to the lead L2. In addition, a circuit is established from lead L1 to contact 134, contact 130, to intermediate tap 136 through the upper portion of reactor coil 138 through the capacitor 140, to the stator windings C and D at Y, and then through parallel circuits consisting of the windings C and D, to Q and R respectively, and from Q and R back to lead L2 as described above.

The above circuits for starting the motor are substantially the same as the circuits described in connection with FIG. 2, the difference being that in the circuit shown in FIG. 11 a relay is used to establish the starting circuits.

When the motor in FIG. 11 reaches a predetermined speed, the centrifugal device 142 transfers the switch blade 124 from a position engaging contact 126 to a position engaging contact 144. The disengagement of switch blade 124 and contact 126 de-energizes relay coil 120 and opens the contacts associated therewith, and the engagement of switch blade 124 and contact 144 energizes another relay coil 146. The circuit for energizing the coil 146 is from lead L1 through switch 122 to switch blade 124, contact 144, through the coil 146, to the lead L2.

The energizing of relay coil 146 moves switch blades 148 and 150 into engagement with associated contacts 152 and 154 respectively and closes the running circuits for the motor. The running circuits are as follows: from lead L1 to contact 154, contact 150, to the stator windings A and C at Q, through parallel circuits of windings A and B in series and windings C and D in series to R, and to the lead L2. A second circuit is also established during running to limit the discharge current of the starting condenser 140. This is a closed loop circuit consisting of a bleeder resistor 156 which is connected to contact 152, switch blade 148, the upper portion of the reactor coil 138, the starting capacitor 140 and back to the opposite side of resistor 156. The capacitor discharge circuit is substantially the same as described in connection with the circuit in FIG. 2 and has connections to X and Y on the stator which are at substantially the same voltage when the motor is running.

It is now apparent that there has been provided a novel motor construction which fulfills all of the objects and advantages sought therefor. Furthermore, this invention is intended to cover all changes, alterations and modifications of the examples of the invention herein chosen for purposes of disclosure, which do not constitute departures from the spirit and scope of the invention, and all such changes, alterations and modifications which will be readily apparent to one skilled in the art are contemplated as being within the scope of the present invention which is limited only by the claims which follow.

What I claim is:

1. A single speed, self-starting, high torque capacitor-start induction run, alternating current motor comprising a rotor having a rotor winding thereon, a stator having a stator winding thereon, input leads connected to one of said windings, said one winding having a two-pole main winding portion and a two-pole starting winding portion positioned electrically at a phase angle relative to said main winding poles, said two-pole main winding portion and said two-pole starting winding portion each having two parallel connected winding elements, capacitor means connected in series with said starting winding elements for changing the phase thereof with respect to the main winding elements during starting of the motor, a reactor element having an intermediate connection to one of the input leads, said reactor element having a first portion on one side of the intermediate connection connected between said input lead and the main winding portion and a second portion on the opposite side of the intermediate connection connected in series with said capacitor means and said starting winding elements, said capacitor means and said starting winding portion producing relatively high starting and pull-in torque with relatively little noise under starting conditions, and speed responsive switch means connected between the input leads and said windings, said switch means including connection means for deactivating the capacitor means and the reactor element whenever the motor speed exceeds a predetermined speed.

2. A single speed, self-starting, high torque capacitor-start induction-run single phase motor comprising a rotor having a rotor winding thereon, a stator having a stator winding thereon, input leads connected to one of said windings to produce a plurality of magnetic poles, one of said windings having a main winding portion and a plurality of starting winding portions positioned on the motor in spaced phase relationship to the main winding portion, said starting winding portions including at least two parallel connected winding elements, a capacitor connected in series with said starting winding elements across the input leads for changing the phase thereof with respect to the main winding portion during starting of the motor, reactor means including a reactor element having an intermediate tap connected to one of the input leads, a first portion of said reactor element on one side of the intermediate tap being connected in series with the capacitor and starting winding elements, and a second portion of said reactor means being connected in circuit with the input leads and the main winding portion, and speed responsive switch means connected to deactuate the capacitor and reactor means during running of the motor, said parallel connected starting winding elements and said capacitor means having parameters that provide relatively high starting and pull-in torque.

3. A single phase alternating current motor comprising a rotor having a rotor winding thereon and a stator having a stator winding thereon, one of said windings having four separate symmetrically positioned winding portions, each of said four portions including at least one winding pole group and all of said four portions to be connected in series to form a closed loop circuit having four circuit junctions positioned therebetween, speed responsive switch means connected between a source of energy and selected ones of said junctions during starting so that two of said four winding portions are positioned in spaced quadrature and are connected to be in magnetic quadrature to the other two of said four winding portions, said two winding portions to act as the main motor winding, and the other two of said winding portions to act as the motor starting winding, means connected to at least one of said winding portions when the motor is operated below a predetermined speed to change the phase thereof, said means including reactor and capacitor means connected in series therewith, said reactor means including a reactor element having end connections and an intermediate connection, a first portion of the reactor element between the intermediate connection and one of said end connections being connected in series with the capacitor means and the starting winding, and a second portion of the reactor element between the intermediate connection and the other end connection being connected to the main winding portion, and a relatively low impedance shunt circuit adapted to be connected across the capacitor means by the switch means at least during the running connection, said switch means also connecting the four winding portions in spaced quadrature across the source during running.

4. The alternating current motor defined in claim 3 wherein said low impedance shunt circuit includes a resistor element and said first portion of said reactor element.

5. A single phase alternating current motor comprising a rotor having a rotor winding thereon, a stator having a stator winding thereon, one of said windings having four separate symmetrically positioned winding portions, each of said four portions including at least one winding pole group, and all of said four portions to be connected in series to form a closed loop circuit having four circuit junctions positioned therebetween, speed responsive switch means connected between a source of energy and selected ones of said junctions during starting so that two of said four winding portions are positioned in spaced quadrature and are connected to be in magnetic quadrature to the other two of said four winding portions, the same two winding portions to act as the main motor winding and the other two of said winding portions to act as the motor starting winding, reactor and capacitor means connected in series with at least one of said winding portions when the motor is operating below a predetermined speed to change the phase thereof, said reactor means including a reactor element having a tap location at an intermediate position thereon, said tap location being connected to the switch means so that the motor main winding current passes through one portion of said reactor during starting of the motor, and a second portion of the reactor is connected in series with the capacitor means and the starting winding portions, said first and second reactor portions producing an autotransformer action therebetween during starting of the motor whereby the voltage across one portion thereof induces a voltage in the other portion that is different from the line voltage.

References Cited in the file of this patent

UNITED STATES PATENTS

| | | |
|---|---|---|
| 514,904 | Bradley | Feb. 20, 1894 |
| 856,477 | Lamme | June 11, 1907 |
| 1,122,491 | Fynn | Dec. 29, 1914 |
| 1,795,063 | Werchsel | Mar. 3, 1931 |
| 1,886,895 | Meyers | Nov. 8, 1932 |
| 1,922,806 | Henrich | Aug. 15, 1933 |
| 2,269,069 | Werner | Jan. 6, 1942 |
| 2,300,708 | Sleeter | Nov. 3, 1942 |
| 2,476,073 | Trickey | July 12, 1946 |
| 2,669,619 | Scheid et al. | Feb. 16, 1954 |
| 2,669,683 | Burdett | Feb. 16, 1954 |
| 2,670,416 | Masheris et al. | Feb. 23, 1954 |
| 2,774,024 | Brammerlo | Dec. 11, 1956 |
| 2,813,239 | La Cour | Nov. 12, 1957 |
| 2,817,050 | La Cour | Dec. 17, 1957 |

FOREIGN PATENTS

| | | |
|---|---|---|
| 421,206 | Great Britain | Dec. 17, 1934 |